United States Patent
Fukuhara

(10) Patent No.: US 9,768,477 B2
(45) Date of Patent: Sep. 19, 2017

(54) SECONDARY BATTERY ABNORMALITY NOTIFICATION SYSTEM

(71) Applicant: NGK INSULATORS, LTD., Nagoya (JP)

(72) Inventor: Motohiro Fukuhara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/995,610

(22) Filed: Jan. 14, 2016

(65) Prior Publication Data

US 2016/0133996 A1 May 12, 2016

Related U.S. Application Data

(63) Continuation of application No. PCT/JP2014/068830, filed on Jul. 15, 2014.

(30) Foreign Application Priority Data

Jul. 19, 2013 (JP) .................................. 2013-150299

(51) Int. Cl.
*H01M 10/48* (2006.01)
*H01M 2/12* (2006.01)
(Continued)

(52) U.S. Cl.
CPC ....... *H01M 10/482* (2013.01); *H01M 2/1077* (2013.01); *H01M 2/1264* (2013.01);
(Continued)

(58) Field of Classification Search
CPC ........... H01M 2200/00; H01M 2/1264; H01M 10/482; H01M 10/425; H01M 10/48; H01M 10/42; H01M 2/12
See application file for complete search history.

(56) References Cited

U.S. PATENT DOCUMENTS

2010/0248008 A1* 9/2010 Sugawara ........... H01M 2/1077
   429/159
2015/0010833 A1* 1/2015 Amendola .......... H01M 4/8647
   429/406

FOREIGN PATENT DOCUMENTS

| JP | 03-158781 A1 | 7/1991 |
| JP | 2004-055373 A1 | 2/2004 |
| WO | 2010/025761 A1 | 3/2010 |

OTHER PUBLICATIONS

International Search Report and Written Opinion (Application No. PCT/JP2014/068830) dated Aug. 26, 2014.
(Continued)

*Primary Examiner* — Mark F Huff
*Assistant Examiner* — Monique Wills
(74) *Attorney, Agent, or Firm* — Burr & Brown, PLLC

(57) ABSTRACT

A secondary battery abnormality notification system includes a module string formed by stacking two or more modules in a vertical direction, the modules each being formed by containing a large number of secondary battery cells, a conduit pipe extending from an upper position to a lower position of the module string, a detection unit provided at a lower position of the module string and configured to draw in a measurement target gas from the conduit pipe to detect concentration of active material contained in the measurement target gas, and a notification section configured to detect occurrence of an abnormality at least based on an output of the detection unit and notify that the abnormality has occurred.

12 Claims, 7 Drawing Sheets

(51) Int. Cl.
*H01M 10/42* (2006.01)
*H01M 2/10* (2006.01)

(52) U.S. Cl.
CPC ..... *H01M 10/425* (2013.01); *H01M 10/4207* (2013.01); *H01M 2/1088* (2013.01); *H01M 2200/00* (2013.01)

(56) References Cited

OTHER PUBLICATIONS

Extended European Search Report, European Application No. 14826475.7, dated Nov. 17, 2016 (7 pages).

\* cited by examiner

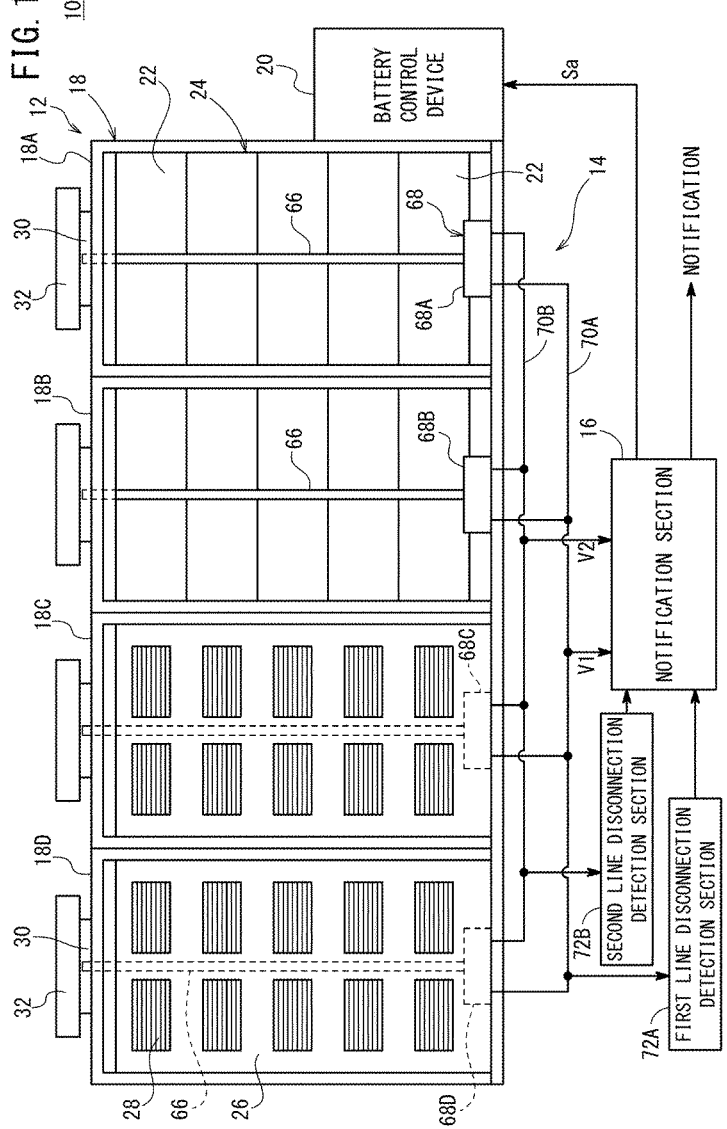

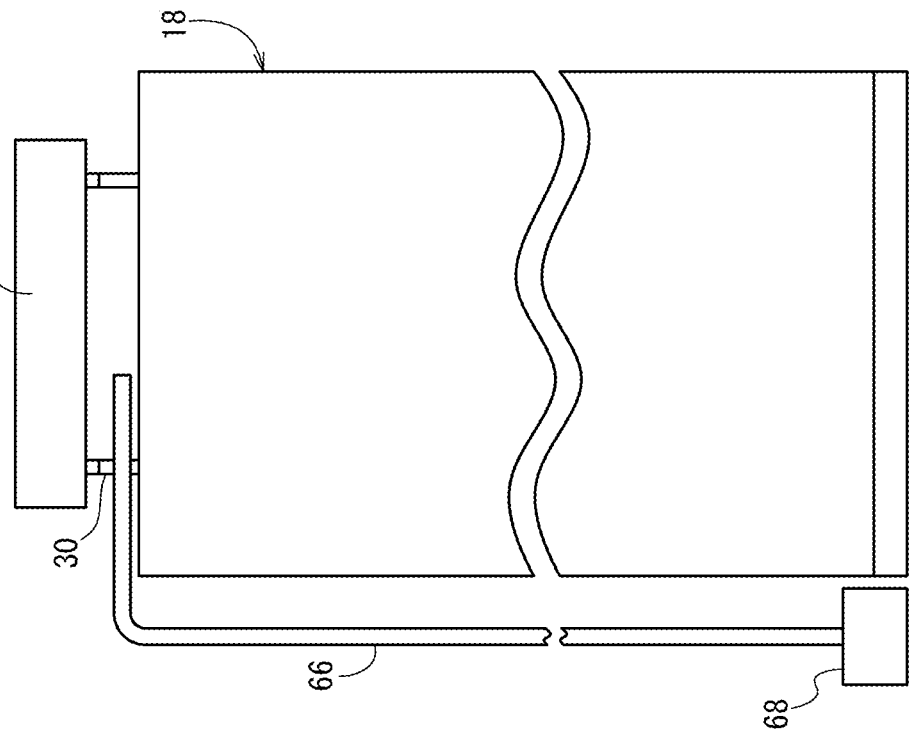
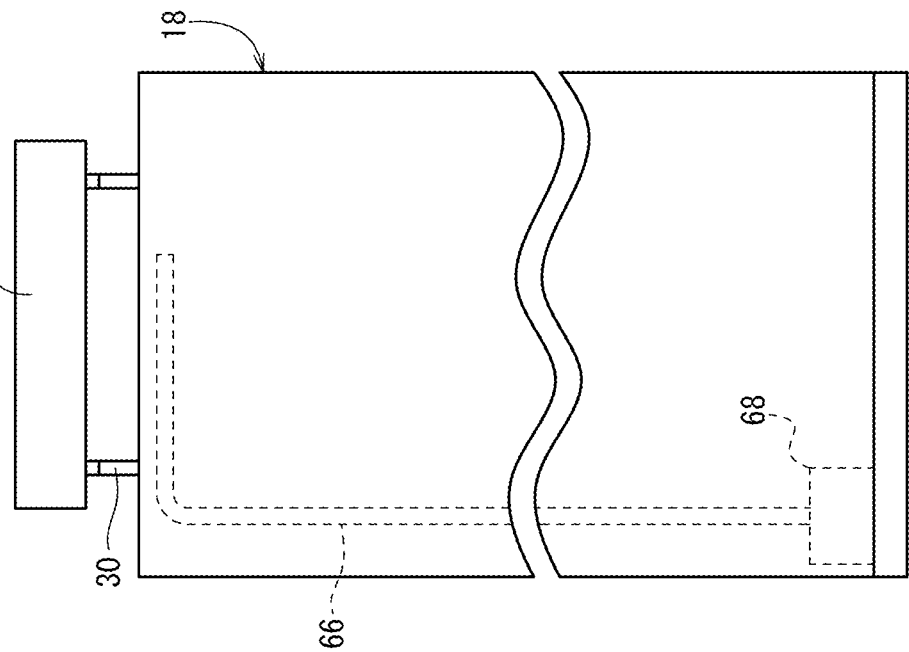

SECONDARY BATTERY ABNORMALITY NOTIFICATION SYSTEM

CROSS-REFERENCE TO RELATED APPLICATIONS

This application is a Continuation of International Application No. PCT/JP2014/068830 filed on Jul. 15, 2014, which was published under PCT Article 21(2) in Japanese, which is based upon and claims the benefit of priority from Japanese Patent Application No. 2013-150299 filed on Jul. 19, 2013, the contents all of which are incorporated herein by reference.

BACKGROUND OF THE INVENTION

Field of the Invention

The present invention relates to a secondary battery abnormality notification system for notifying that an abnormality has occurred, based on leakage of active material from at least a secondary battery.

Description of the Related Art

In general, frequency adjustment in an electric power system and adjustment of power demand and power supply in the electric power system are carried out using a plurality of power generators, storage batteries, etc., equipped in the electric power system. Further, in most cases, adjustment in difference between electric power generated by natural energy power generators and the planned output electric power, and reduction in change of electric power generated by the natural energy power generators are also performed using the power generators, storage batteries, etc. In comparison with general electric power generators, the storage batteries can change the electric power output at high speed, and thus is effective in frequency adjustment of the electric power system, adjustment of the difference between the generated electric power from the natural energy power generators and the planned output electric power, and adjustment of power demand and power supply in the electric power system.

In this regard, as a high-temperature operation type storage battery connected to the electric power system, a sodium-sulfur battery (hereinafter referred to as the NaS battery) is used, for example. This NaS battery is a high temperature type secondary battery containing metal sodium and sulfur as active materials in an isolated manner using a solid electrolyte pipe. When the NaS battery is heated at high temperature of about 300° C., a certain amount of energy is produced by an electrochemical reaction of both of the melted active materials of these metal sodium and sulfur. Normally, the NaS battery is foisted by assembling a plurality of battery cells, and used in a form of a module including a plurality of battery cells connected together. That is, the module has a structure where circuits (strings) each formed by connecting a plurality of battery cells in series are connected in parallel to form a block, and at least two blocks are connected in series, and placed in a heat insulating container.

As a method of reporting occurrence of an abnormality of such a module, a method of detecting an abnormality of a battery by comparing electric discharge depth of each block, and reporting the abnormality has been disclosed (e.g., Japanese Laid-Open Patent Publication No. 03-158781). In this method, the presence or absence of the abnormality is determined for each of the blocks of the module. Therefore, in comparison with the case of detecting the abnormality for each of the NaS battery cells of each block, the apparatus is not complicated, and the production cost can be reduced advantageously.

SUMMARY OF THE INVENTION

It is considered that failures in the battery cells and thus failures in the modules are caused by internal short circuiting or external short circuiting in the battery cells.

For example, external short circuiting of the battery cells may be caused by formation of an external short circuiting loop due to leakage of active material in the battery cells. For example, internal short circuiting of the battery cells may be caused by damages, etc. of a beta tube.

External short circuiting and internal short circuiting of these battery cells can be detected by checking voltage change in each of the above described blocks. However, the voltage change due to short circuiting does not occur rapidly, but occur gradually over a relatively long period of time. Therefore, if the detection accuracy is low, initial response to the occurrence of the failure may be delayed undesirably. In an attempt to address the problem, it may be possible to improve the accuracy with which to detect the voltage change. Further, it is desired to propose a failure detection scheme which is different from the scheme of detecting the voltage change.

The present invention has been made to take the problems of this type into account, and an object of the present invention is to provide a secondary battery abnormality notification system which makes it possible to draw in a gas (atmosphere) from an upper portion of a module string formed by stacking two or more modules and detect concentration of active material contained in the gas for thereby detecting occurrence of an abnormality and issuing a notification of the abnormality at an early stage.

[1] A secondary battery abnormality notification system according to the present invention includes a module string, a conduit pipe, a detection unit, and a notification section. The module string is formed by stacking two or more modules in a vertical direction. Each of the modules is formed by containing a large number of secondary battery cells. The conduit pipe extends from an upper position to a lower position of the module string. The detection unit is provided at a lower position of the module string and configured to draw in a measurement target gas from the conduit pipe to detect concentration of active material contained in the measurement target gas. The notification section detects occurrence of an abnormality at least based on an output of the detection unit and notifies that the abnormality has occurred.

The air heated by heat produced during normal operation of the module moves upward, and flows toward an upper position of the module string. That is, upward movement of the air is generated. Therefore, the gas (measurement target gas) containing active material that has leaked from the secondary battery moves to the upper position of the module string by this upward movement of the air. The measurement target gas flows through the conduit pipe, and is guided into the detection unit provided at a lower position of the module string. Further, at the time of occurrence of a fire in the module string or immediately before occurrence of a fire in the module string, the measurement target gas containing a large quantity of leaked active material moves toward an upper position of the module string by the upward movement of the air. Therefore, the measurement target gas containing high concentration of active material flows into the conduit pipe, and is then guided into the detection unit.

Consequently, the detection unit can detect occurrence of the abnormality easily, and it becomes possible to report occurrence of the abnormality at an early stage. In particular, since the measurement target gas which has moved up to an upper position of the module string is drawn into a lower portion of the module string through the conduit pipe and then introduced into the detection unit, the detection unit is not exposed to high-temperature atmosphere. It is possible to avoid erroneous operation or damage due to the heat.

[2] In the present invention, the module string may be placed in a box shaped casing, and the casing may include an air intake opening formed in a front surface of the casing and an air exhaust opening formed at an upper position of the casing. The conduit pipe may extend from the air exhaust opening to a lower position of the casing.

[3] In the present invention, the detection unit may include a chamber room, a pump configured to draw a gas from the conduit pipe into the chamber room and discharge the gas, a gas sensor configured to detect concentration of active material contained in the measurement target gas in the chamber room, and a first comparator configured to compare concentration detected by the gas sensor with a predetermined upper limit concentration value. A comparison result obtained in the first comparator may be outputted to the notification section.

[4] In this case, the secondary battery abnormality notification system may be wired using a detection power source and a first detection circuit line, the detection unit may have a contact point configured to selectively open or short-circuit a connector portion with the first detection circuit line in accordance with an output of the first comparator, and the notification section may notify that an abnormality of gas concentration has occurred, based on a voltage change of the first detection circuit line depending on whether the connector portion of the detection unit is opened or short-circuited.

[5] Further, the secondary battery abnormality notification system may include a first terminal resistor connected in parallel to a terminal end of the first detection circuit line. The notification section may notify that line disconnection of the first detection circuit line has occurred, based on a voltage change resulting from line disconnection of the first detection circuit line.

[6] In the case of [4] or [5], the secondary battery abnormality notification system may further include a second detection circuit line connected to the detection unit. The detection unit may further include a second comparator configured to compare an output of the gas sensor with a predetermined lower limit output value, and a second contact point configured to selectively open or short-circuit a connector portion with the second detection circuit line in accordance with a comparison result of the second comparator, and the notification section may notify that a sensor abnormality has occurred, based on a voltage change of the second detection circuit line depending on whether the connector portion of the detection unit is opened or short-circuited.

[7] In the case of [4] or [5], the secondary battery abnormality notification system may further include a second detection circuit line connected to the detection unit. The detection unit may further include a third comparator configured to compare an exhaust air flow rate of the pump with a predetermined lower limit flow rate value, and a second contact point configured to selectively open or short-circuit a connector portion with the second detection circuit line in accordance with a comparison result of the third comparator, and the notification section may notify that a pump abnormality has occurred, based on a voltage change of the second detection circuit line depending on whether the connector portion of the detection unit is opened or short-circuited.

[8] In the case of [4] or [5], the secondary battery abnormality notification system may further include a second detection circuit line connected to the detection unit. The detection unit may further include a second comparator configured to compare an output of the gas sensor with a predetermined lower limit output value, a third comparator configured to compare an exhaust air flow rate of the pump with a predetermined lower limit flow rate value, and a second contact point configured to selectively open or short-circuit a connector portion with the second detection circuit line in accordance with comparison results of the second comparator and the third comparator, and the notification section may notify that an abnormality has occurred, based on a voltage change of the second detection circuit line depending on whether the connector portion of the detection unit is opened or short-circuited.

[9] In the cases [6] to [8], the secondary battery abnormality notification system may further include a second terminal resistor connected in parallel to a terminal end of the second detection circuit line. The notification section may notify that line disconnection of the second detection circuit line has occurred, based on a voltage change resulting from line disconnection of the second detection circuit line.

[10] In the present invention, the secondary battery abnormality notification system may further include a battery control device configured to control operation of the secondary battery cells. The notification section may output an operation stop signal to the battery control device at the time of notifying that the abnormality has occurred, and the battery control device may stop operation of the secondary battery cells based on an input of the operation stop signal from the notification section.

As described above, in the secondary battery abnormality notification system according to the present invention, a gas (atmosphere) at an upper portion of a module string formed by stacking two or more modules is drawn in, and concentration of active material contained in the gas is detected. In this manner, it becomes possible to detect occurrence of an abnormality and issue a notification of the abnormality at an early stage.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a diagram showing structure of a secondary battery abnormality notification system according to an embodiment of the present invention;

FIG. 5A is a view showing an example in which a detection unit is provided inside a casing;

FIG. 5B is view showing an example in which a detection unit is provided outside a casing;

DETAILED DESCRIPTION OF THE INVENTION

Figure 2A:
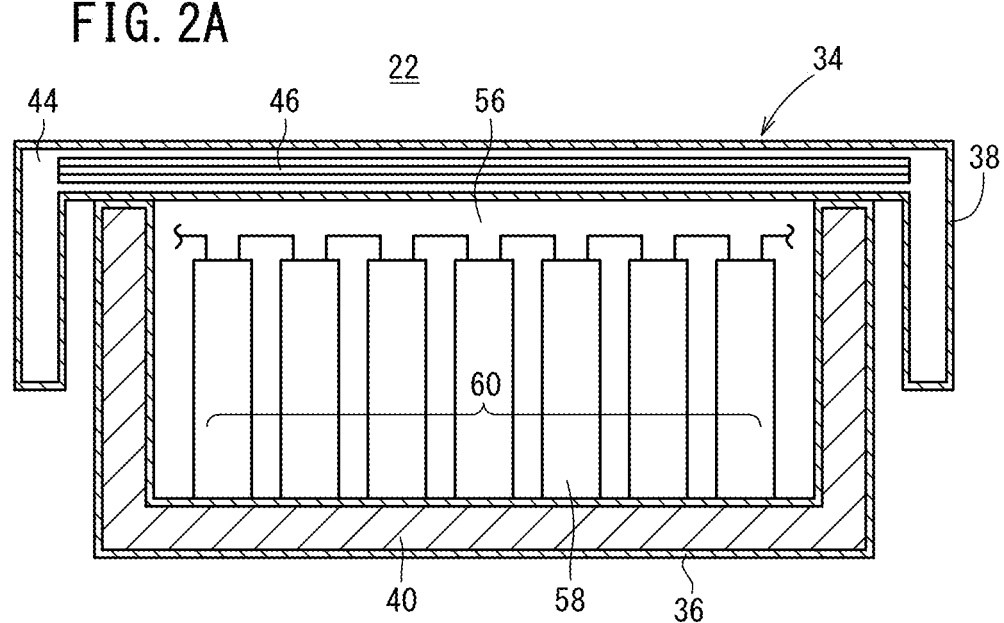
FIG. 2A is a cross sectional view showing structure of a module.

Hereinafter, an embodiment of a secondary battery abnormality notification system according to the present invention, e.g., applied to a NaS battery will be described with reference to FIGS. 1 to 7.

As shown in FIG. 1, a secondary battery abnormality notification system 10 according to the embodiment of the present invention includes a package 12 as a secondary battery storage section, a detection section 14, and a notification section 16.

The package 12 has structure where a plurality of box shaped casings 18 are arranged in a lateral direction. In an example of FIG. 1, four casings 18 (first casing 18A to fourth casing 18D) are arranged in the lateral direction. Further, the package 12 includes a battery control device 20 for controlling operation of a secondary battery.

Each of the casings 18 contains therein a module string 24 formed by stacking two or more modules 22 in the vertical direction. In the example of FIG. 1, five modules 22 are stacked together to form one module string 24. Further, a plurality of air intake openings 28 communicating with the outside are provided on a side surface such as a door 26 of the casing 18. An air exhaust opening 30 communicating with the outside and an air exhaust opening ratio adjustment mechanism 32 for changing the opening ratio of the air exhaust opening 30 are provided at an upper position of the casing 18. FIG. 1 shows a state where, in two casings 18 (first casing 18A and second casing 18B) of the four casings, doors 26 are removed such that the module strings 24 in these casings 18 are visible.

Then, in the package 12, heat radiated inside the casings 18 during operation is transmitted to the air, and released to the outside by the gas (air) discharged from the air exhaust openings 30 of the casings 18. In the meanwhile, a fresh gas (air) flows into the casings 18 from the outside through the air intake openings 28, whereby natural ventilation is performed. At this time, the opening ratios of the air exhaust openings 30 are adjusted by the air exhaust opening ratio adjustment mechanisms 32. Thus, heat energy inside the casings 18 is adjusted. It should be noted that, preferably, a mechanism shown in FIGS. 3 and 4 of Japanese Laid-Open Patent Publication No. 2004-055373 should be adopted as the air exhaust opening ratio adjustment mechanism 32, for example.

Figure 2B:
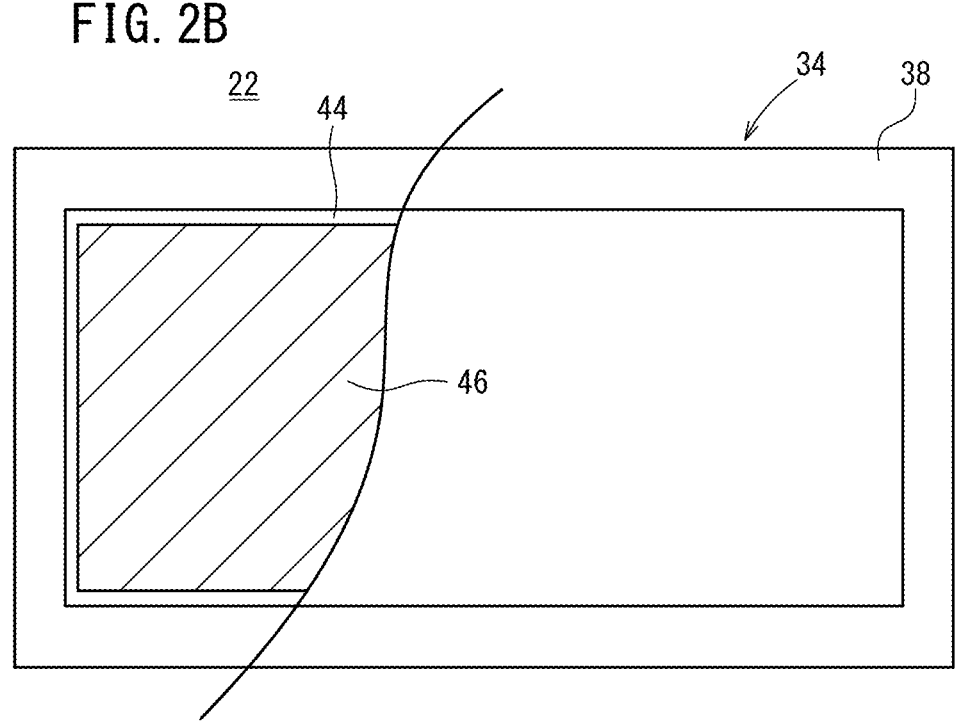
FIG. 2B is a top view with parts broken away, showing the structure of the module.

Next, structure of the module 22, in particular, structure of a housing 34 will be described with reference to FIG. 2A and FIG. 2B.

The housing 34 is a heat insulating container, and includes a box body 36 having an opening on its upper surface and a lid body 38 having an opening on its lower surface.

The box body 36 is formed of a plate member of, e.g., stainless steel, and formed in a box shape having a hollow area. The hollow area is a space sealed in an air-tight manner, and can communicate with an external space through a vacuum valve (not shown). A porous vacuum heat insulating board 40 formed by solidifying glass fiber in a plate shape using adhesive is placed in the hollow area to form the box body 36 as a vacuum heat insulating structure.

In the same manner as in the case of the box body 36, the lid body 38 is formed of a plate member of, e.g., stainless steel. A heat insulating material layer 42 for achieving the required minimum heat insulating property (see FIG. 3) is placed on an inner surface (lower surface) of the lid body 38, and at least two stacked detachable heat insulating plates 46 are arranged (stacked) in a hollow area 44 to provide air heat insulating structure only in the lid body 38 (upper surface). In the structure, the amount of heat radiation from the upper surface of the housing 34 can be controlled.

Figure 3:
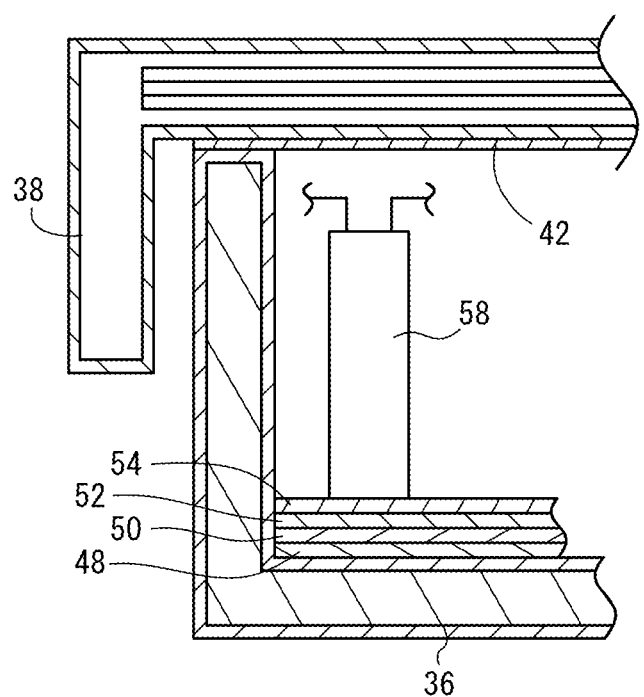
FIG. 3 is an enlarged cross sectional view showing part of the module shown in FIG. 2A.

As shown in FIG. 3, a buffer member 48, a heater 50, a reinforcement plate 52, and a mica sheet 54 for electrical insulation are stacked together and placed on a bottom surface inside the box body 36. The heater 50 is also placed on one side surface of the box body 36.

One battery structural body 60 formed by a large number of battery cells (secondary batteries) 58 is placed upright in an internal space 56 of the housing 34 defined by the box body 36 and the lid body 38. In order to suppress damage and abnormal heating of the battery cells 58 or leakage of active material, etc., a gap between the box body 36 and the battery structural body 60 is filled with silica sand as fire extinction sand, though not shown.

Figure 4:
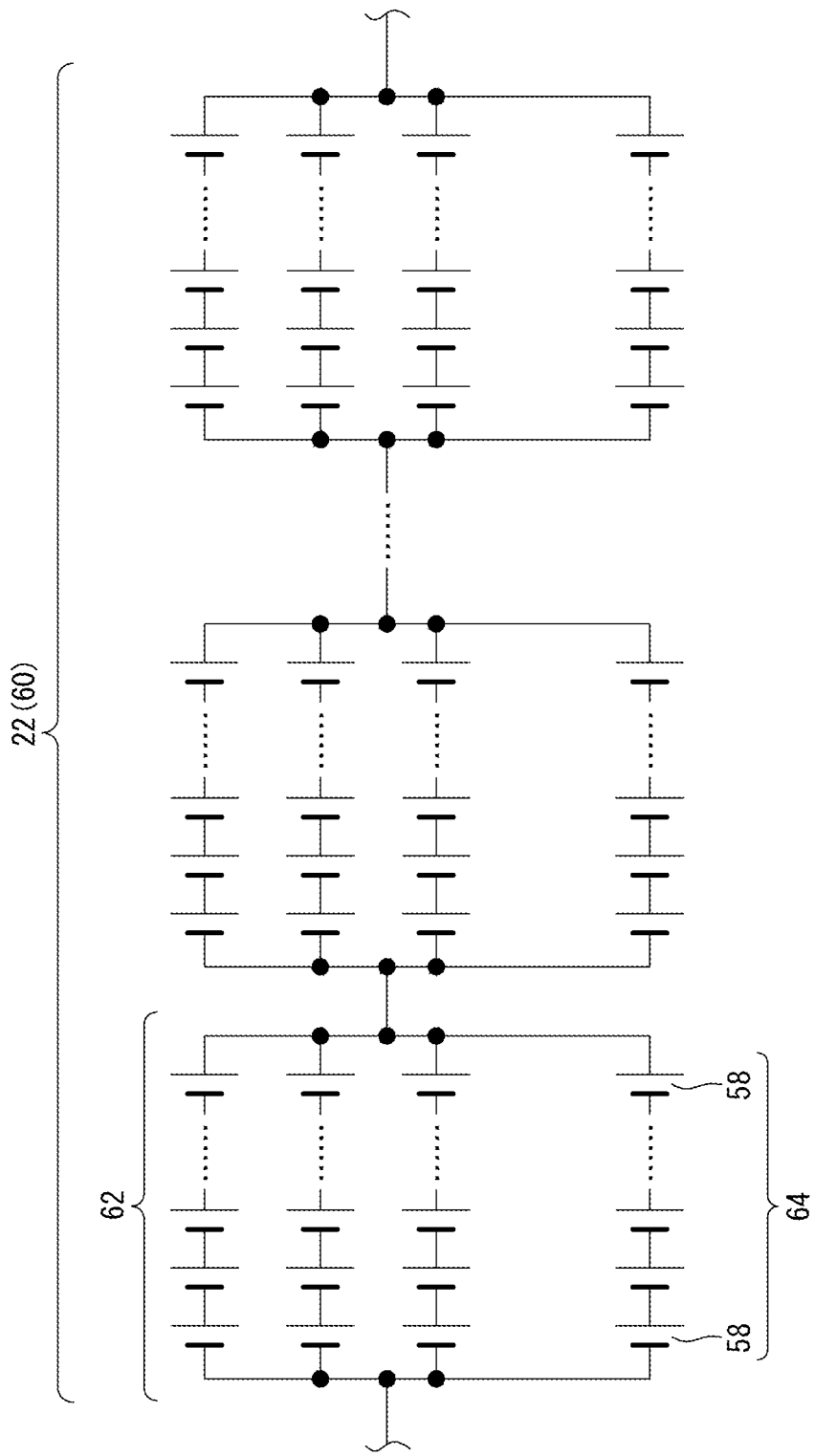
FIG. 4 is an equivalent circuit diagram showing a battery structural body included in the module.

As shown in FIG. 4, the battery structural body 60 is formed by connecting two or more blocks 62 in series. Each of the blocks 62 is formed by connecting two or more circuits (strings 64) in parallel, and each of the strings 64 is formed by connecting two or more battery cells 58 in series. For example, eight battery cells 58 are connected in series to form one string 64, and twelve strings 64 are connected in parallel to form one block 62, and four blocks 62 are connected in series to form one battery structural body 60.

Further, as shown in FIG. 1, the detection section 14 includes a conduit pipe 66 and a detection unit 68. The conduit pipe 66 extends from an upper position to a lower position of the corresponding module string 24 for each of the casings 18. The detection unit 68 is provided at a lower position of the module string 24. The detection unit 68 draws in a measurement target gas from the conduit pipe 66, and detects concentration of active material contained in the measurement target gas. That is, first to fourth detection units 68A to 68D are provided respectively with respect to the first casing 18A to the fourth casing 18D.

Specifically, the conduit pipe 66 extends from the air exhaust opening 30 to a lower position of the casing 18. In this case, the detection unit 68 may be provided inside the casing 18, and may be provided outside the casing 18. In the case where the detection unit 68 is provided inside the casing 18, as shown in FIG. 5A, the conduit pipe 66 extends from a position inside the casing 18 that is adjacent to the air exhaust opening 30, to the detection unit 68 through the inside of the casing 18. In the case where the detection unit 68 is provided outside the casing 18, as shown in FIG. 5B, the conduit pipe 66 extends from a position inside the casing 18 that is adjacent to the air exhaust opening 30, to the detection unit 68, through the air exhaust opening 30 and along the outside (upper surface and side surface) of the casing 18.

Further, the conduit pipe 66 is formed by connecting a metal pipe and a resin pipe, for example. In this case, for example, the metal pipe is provided in correspondence with the straight segment, and the resin pipe is provided in correspondence with the bent segment (or curved segment). As the metal pipe, for example, a copper pipe, a copper alloy pipe, or a stainless steel pipe may be used. As the resin pipe, for example, a fluororesin pipe or a Teflon (registered trade mark) pipe may be used.

Further, as shown in FIG. 1, the detection section 14 includes a first detection circuit line 70A, a second detection circuit line 70B, a first line disconnection detection section 72A for detecting line disconnection of the first detection circuit line 70A, and a second line disconnection detection section 72B for detecting line disconnection of the second detection circuit line 70B.

Figure 6:
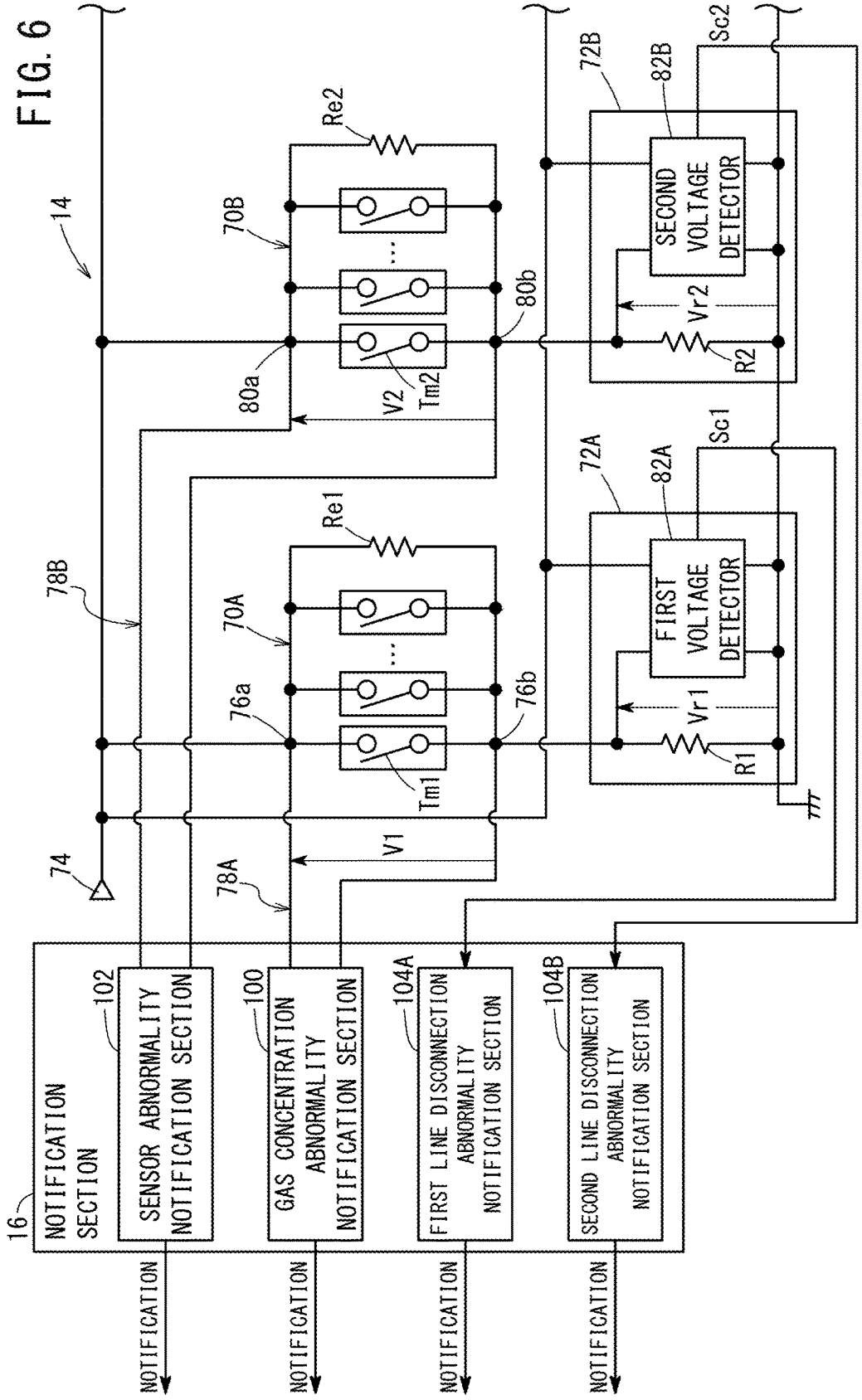
FIG. 6 is a circuit diagram showing structure of a detection section.

Specifically, as shown in FIG. 6, the first detection circuit line 70A includes four first contact points Tm1 and a first terminal resistor Re1. The four first contact points Tm1 are connected between a detection power source 74 and the ground, and connected in parallel in correspondence with the first casing 18A to the fourth casing 18D. The first terminal resistor Re1 is connected in parallel to the first contact points Tm1 at the terminal end.

First cables 78A are connected to both ends (one terminal 76a and the other terminal 76b) of the first detection circuit line 70A. The first cables 78A extend up to the notification section 16. The voltage V1 across both terminals of the first detection circuit line 70A is transmitted to the notification section 16 through the first cables 78A.

Likewise, the second detection circuit line 70B includes four second contact points Tm2 and a second terminal resistor Re2. The four second contact points Tm2 are connected between the detection power source 74 and the ground, and connected in parallel in correspondence with the first casing 18A to the fourth casing 18D. The second terminal resistor Re2 is connected in parallel to the second contact points Tm2 at the terminal end.

Further, second cables 78B are connected to both ends (one terminal 80a and the other terminal 80b) of the second detection circuit line 70B. The second cables 78B extend up to the notification section 16. The voltage V2 across both terminals of the second detection circuit line 70B is transmitted to the notification section 16 through the second cables 78B.

The first line disconnection detection section 72A includes a first resistor R1 for line disconnection detection and which is connected between the other terminal 76b of the first detection circuit line 70A and the ground, and a first voltage detector 82A for detecting the voltage Vr1 across both terminals of the first resistor R1. As the first voltage detector 82A, for example, a circuit for outputting a signal indicating an abnormality in the event that the voltage Vr1 across both terminals of the first resistor R1 is decreased beyond a normal range should preferably be adopted.

In this regard, resistance values of the first terminal resistor Re1 and the first resistor R1 are determined respectively in the following manner. Specifically, the resistance values of the first terminal resistor Re1 and the first resistor R1 are determined such that, if no line disconnection occurs in the first detection circuit line 70A, the voltage Vr1 across both terminals of the first resistor R1 falls within a normal range of the first voltage detector 82A, e.g., 2 V, as a result of voltage division by the resistors, i.e., the first terminal resistor Re1 and the first resistor R1. If line disconnection occurs in the first detection circuit line 70A, the voltage Vr1 across both terminals of the first resistor R1 drops below the normal range of the first voltage detector 82A, e.g., drops to 0 V. In this case, a first abnormality signal Sc1 indicating occurrence of line disconnection is outputted from the first voltage detector 82A, and the first abnormality signal Sc1 is inputted to the notification section 16.

The second line disconnection detection section 72B includes a second resistor R2 for line disconnection detection and which is connected between the other terminal 80b of the second detection circuit line 70B and the ground, and a second voltage detector 82B for detecting the voltage Vr2 across both terminals of the second resistor R2. Setting of the resistance values of the second terminal resistor Re2 and the second resistor R2, and operation of the second voltage detector 82B are performed in the same manner as in the case of the above described first line disconnection detection section 72A, and description thereof is omitted. In the case where line disconnection occurs in the second detection circuit line 70B, a second abnormality signal Sc2 indicating line disconnection is outputted from the second voltage detector 82B, and the second abnormality signal Sc2 is inputted to the notification section 16.

Figure 7:
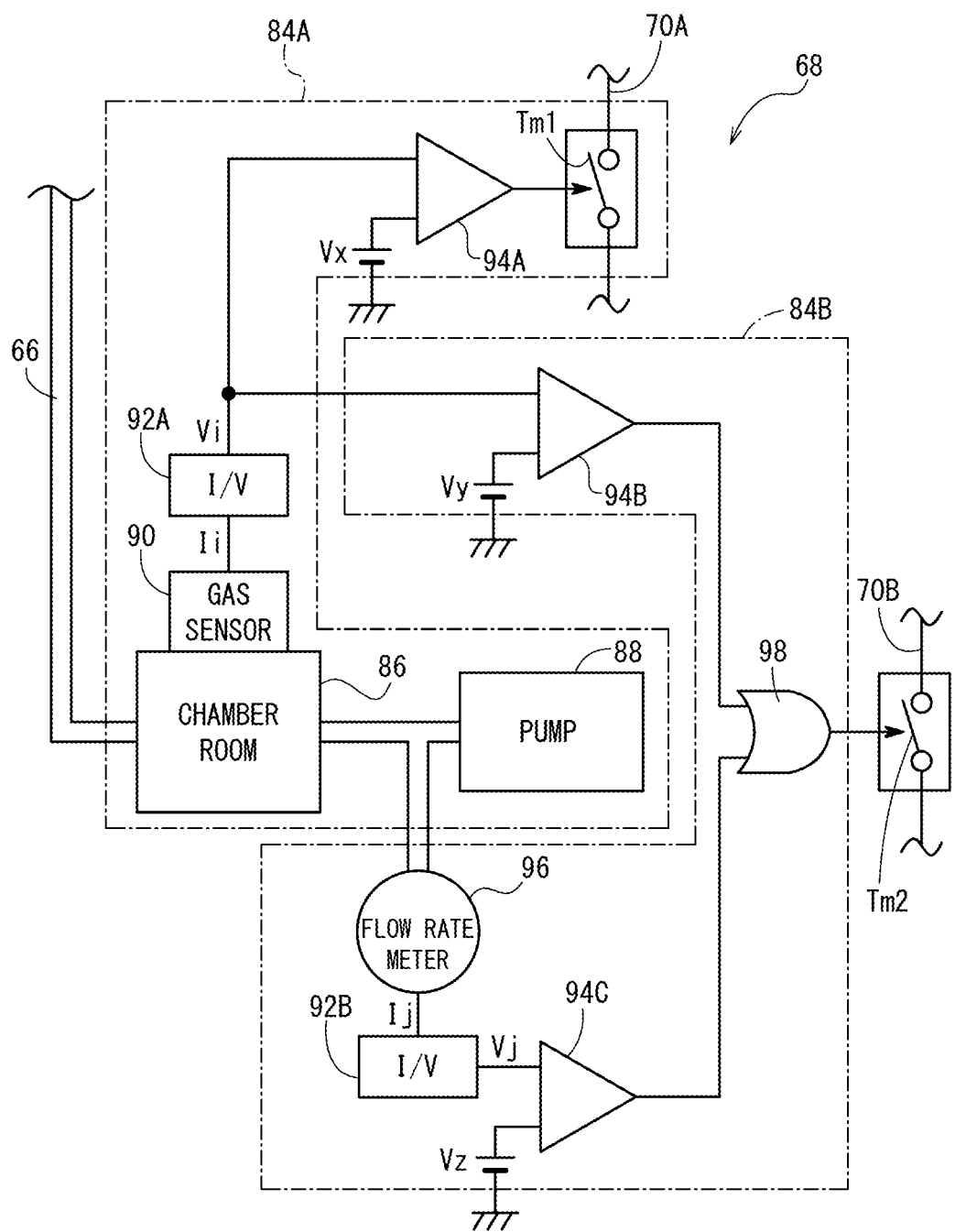
FIG. 7 is a block diagram showing structure of the detection unit.

As shown in FIG. 7, the detection unit 68 includes a first detection device 84A for detecting an abnormality of gas concentration, and a second detection device 84B for detecting an abnormality of a sensor or an abnormality of the pump flow rate.

The first detection device 84A includes a chamber room 86, a pump 88 for drawing the measurement target gas of the conduit pipe 66 into the chamber room 86 and discharging the gas, and a gas sensor 90 for detecting concentration of active material contained in the measurement target gas of the chamber room 86. Further, the first detection device 84A includes a first current/voltage converter 92A (I/V) for converting the output (detected current Ii) of the gas sensor 90 into output voltage Vi, and a first comparator 94A for comparing the output voltage Vi of the gas sensor 90 with a predetermined upper limit concentration value (voltage Vx). Further, the first detection device 84A has the above first contact point Tm1 for opening or short-circuiting the connector portion with the first detection circuit line 70A, in accordance with the output of the first comparator 94A. The chamber room 86 having a capacity per unit length larger than that of the conduit pipe 66 is adopted to achieve the function of maintaining the flow rate of the measurement target gas in the chamber room 86 at a certain level. In this manner, it is possible to realize highly-accurate detection of concentration of active material by the gas sensor 90.

Further, for example, during normal operation, since the measurement target gas contains a minute interference gas component, the output (concentration) of the gas sensor 90 does not exceed the upper limit concentration value. Therefore, for example, a low level signal is outputted from the first comparator 94A, and the first contact point Tm1 maintains the connector portion with the first detection circuit line 70A, in an open state. If all of the first contact points Tm1 corresponding to the first casing 18A to the fourth casing 18D are in the open state, the voltage V1 across both terminals of the first detection circuit line 70A is equivalent to the voltage across both terminals of the first terminal resistor Re1. The voltage is transmitted to the notification section 16 through the first cables 78A.

Further, at the time of occurrence of a fire in a certain casing 18, or immediately before occurrence of a fire in a certain casing 18, the measurement target gas containing a large quantity of leaked active material moves toward the air exhaust opening 30 by the upward movement of the gas due to heat. Therefore, the measurement target gas containing high concentration of active material flows into the conduit pipe 66, and the measurement target gas is guided into the corresponding detection unit 68. As a result, the output (concentration) of the gas sensor 90 exceeds the upper limit concentration value, and for example, a high level signal is outputted from the first comparator 94A. Therefore, the first contact point Tm1 places the connector portion with the first detection circuit line 70A in a short circuiting state. Even if only one of the four first contact points Tm1 connected to the first detection circuit line 70A is placed in the short circuiting state, the voltage V1 across both terminals of the first detection circuit line 70A becomes substantially 0 V. This voltage is transmitted to the notification section 16 through the first cables 78A.

Therefore, by monitoring the voltage V1 across both ends of the first detection circuit line 70A, it is possible to easily detect whether the package of cells is in a normal operating state or in a state where a fire has occurred or a fire is likely to occur in one or more of the first casing 18A to the fourth casing 18D.

The second detection device 84B includes a second comparator 94B for comparing the output voltage Vi of the gas sensor 90 with a predetermined lower limit output value (Voltage Vy), and a flow rate meter 96 for measuring the flow rate of the exhaust air of the pump 88. Further, the second detection device 84B includes a second current/voltage converter 92B (I/V) for converting the output (detected current Ij) of the flow rate meter 96 into the output voltage Vj, and a third comparator 94C for comparing the output voltage Vj of the flow rate meter 96 with a predetermined lower limit flow rate value (Voltage Vz). Further, the second detection device 84B includes an OR circuit 98 for outputting a logical sum of the output from the second comparator 94B and the output from the third comparator 94C, and the above described second contact point Tm2 for opening or short-circuiting the connector portion with the second detection circuit line 70B depending on the output of the OR circuit 98.

For example, in the case where an active-material concentration range of 0 to 150 ppm corresponds to a range of the output (detected current) of 4 to 20 mA (direct current) in the gas sensor 90, if the output of the gas sensor 90 is less than 4 mA, it can be seen that the gas sensor 90 has an abnormality (failure). Therefore, in this example, by setting the lower limit output value (Vy) to a voltage corresponding to 4 mA, when the gas sensor 90 is in the normal state, since the output of the gas sensor 90 is 4 mA or more, for example, a low level signal is outputted from the second comparator 94W.

Then, in the case where a failure or the like has occurred in a gas sensor 90 of a certain detection unit 68, for example, due to deterioration with age, as described above, regardless of the concentration of active material, since the output of the gas sensor 90 becomes less than 4 mA, for example, a high level signal is outputted from the second comparator 94W.

Likewise, if the value measured by the flow rate meter 96 is less than 2.5 liters/min even though the pump 88 is designed to discharge the gas at a certain flow rate (e.g., 3 liters/min), it can be seen that the gas discharge flow rate of the pump 88 has been decreased, i.e., an abnormality has occurred in the flow rate of the pump 88. Therefore, in this example, if the lower limit flow rate value (Vz) is set to a voltage corresponding to 2.5 liters/min, when the pump 88 is in the normal state, since the output of the pump 88 is 2.5 liters/min or more, for example, a low level signal is outputted from the third comparator 94C.

Then, in the case where the exhaust air flow rate of the pump 88 of a certain detection unit 68 is decreased, e.g., due to deterioration with age, as described above, since the value of the flow rate measured by the flow rate meter 96 is less than 2.5 liters/min, for example, a high level signal is outputted from the third comparator 94C.

If the second comparator 94B and the third comparator 94C each output the low level signals, the second contact point Tm2 maintains the connector portion with the second detection circuit line 70B in an open state. In the case where all of the second contact points Tm2 corresponding to the first casing 18A to the fourth casing 18D are in the open state, the voltage V2 across both terminals of the second detection circuit line 70B is equivalent to the voltage across both terminals of the second terminal resistor Re2. This voltage is transmitted to the notification section 16 through the second cables 78B.

Conversely, in the case where the second comparator 94B or the third comparator 94C outputs the high level signal, or the second comparator 94B and the third comparator 94C each output the high level signals, the second contact point Tm2 places the connector portion with the second detection circuit line 70B in a short circuiting state. Even if only one of the four second contact points Tm2 connected to the second detection circuit line 70B is placed in the short circuit state, the voltage V2 across both terminals of the second detection circuit line 70B becomes substantially 0 V. This voltage is transmitted to the notification section 16 through the second cables 78B.

Therefore, by monitoring the voltage V2 across both terminals of the second detection circuit line 70B, it is possible to easily detect whether all the sensors are normal or at least one of the sensors of the first casing 18A to the fourth casing 18D has an abnormality.

As shown in FIG. 6, the notification section 16 includes a gas concentration abnormality notification section 100, a sensor abnormality notification section 102, a first line disconnection abnormality notification section 104A, and a second line disconnection abnormality notification section 104B.

The gas concentration abnormality notification section 100 determines the presence or absence of a gas concentration abnormality in the package 12 based on the voltage V1 across both terminals of the first detection circuit line 70A transmitted through the first cables 78A. In this example, in the case where the voltage V1 across both terminals is substantially 0 V, occurrence of the gas concentration abnormality is reported. For example, the gas concentration abnormality notification section 100 stores at least an identification number of the package 12 and an identification code indicating the gas concentration abnormality in a transmission file, and transmits the transmission file to a monitor center, etc. to notify that the gas concentration abnormality has occurred. In this case, the notification may be transmitted through a public communication network such as the Internet or a mobile phone network. Further, the notification may be transmitted to a local user, a local administrator, etc., in addition to the monitor center. Further, in addition to the notification through data communication, the notification may be reported using a telephone for making it possible to achieve the prompt initial response to occurrence of the gas concentration abnormality.

The monitor center identifies the package 12 based on the contents stored in the received transmission file. Further, the monitor sensor identifies a module 22 that is a source of the gas concentration abnormality, based on voltage data of the secondary batteries accumulated on a module by module basis or on a block by block basis in a database corresponding to the identified package 12. Then, the monitor center notifies a local user, a local administrator, etc., of the identified package and module. In this manner, it is possible to take action with respect to the identified source of the gas concentration abnormality at an early stage. Thus, it becomes possible to suppress expansion of the damage.

Next, the sensor abnormality notification section 102 determines the presence or absence of a sensor abnormality in the package 12 based on the voltage V2 across both terminals of the second detection circuit line 70B transmitted through the second cables 783. In this example, in the case where the voltage across both terminals is substantially 0 V, occurrence of the sensor abnormality is reported. For example, the sensor abnormality notification section 102 stores at least an identification number of the package 12 and an identification code indicating the sensor abnormality in a transmission file, and transmits the transmission file to a monitor center, etc, to notify that the sensor abnormality has occurred.

The first line disconnection abnormality notification section 104A notifies that a line disconnection abnormality of the first detection circuit line 70A has occurred, based on input of a first abnormality signal Sc1 from the first line disconnection detection section 72A (first voltage detector 82A). For example, the first line disconnection abnormality notification section 104A stores at least an identification number of the package 12 and an identification code indicating the line disconnection abnormality of the first detection circuit line 70A in a transmission file, and transmits the transmission file to a monitor center, etc. to notify that the line disconnection abnormality of the first detection circuit line 70A has occurred.

Likewise, the second line disconnection abnormality notification section 104B notifies that a line disconnection abnormality of the second detection circuit line 70B has occurred, based on input of a second abnormality signal Sc2 from the second line disconnection detection section 72B (second voltage detector 82B). For example, the second line disconnection abnormality notification section 104B stores at least an identification number of the package 12 and an identification code indicating a line disconnection abnormality of the second detection circuit line 70B in a transmission file, and transmits the transmission file to a monitor center, etc. to notify that the line disconnection abnormality of the second detection circuit line 70B has occurred.

Further, in the event of occurrence of a gas concentration abnormality, a sensor abnormality, or a line disconnection abnormality, in addition to the above notifications, as shown in FIG. 1, the notification section 16 outputs an operation stop signal Sa to the battery control device 20. The battery control device 20 stops operation of the secondary batteries based on the input of operation stop signal Sa, according to a predetermined sequence for stopping operation.

Operation of the secondary batteries is stopped also in the event of the sensor abnormality and line disconnection abnormality for the following reason. In the presence of at least one of the sensor abnormality and the line disconnection abnormality, the gas concentration abnormality cannot be detected, and the initial response to the occurrence of a gas concentration abnormality may be delayed undesirably. In an attempt to avoid the above undesired situation, by stopping operation of the secondary batteries also in the event of the sensor abnormality, or the line disconnection abnormality, it is possible to enhance the security.

As described above, in the secondary battery abnormality notification system 10 according to the embodiment of the present invention, measurement target gas at an upper position of the module string 24 formed by stacking two or more modules 22 is drawn-in to detect the concentration of active material contained in the measurement target gas. In this manner, it is possible to detect the occurrence of a gas concentration abnormality, and report the gas concentration abnormality at an early stage. In particular, the measurement target gas which has moved up to an upper position of the module string 24 is drawn into a lower position of the module string 24 through the conduit pipe 66 and guided to the detection unit 68. Therefore, the detection unit 68 is not exposed to the high temperature atmosphere. Thus, it is possible to avoid erroneous operation of or damage to the detection unit due to the heat.

Further, the sensor abnormality in each of the detection units 68, and the line disconnection abnormality of the first detection circuit line 70A and the second detection circuit line 70B are reported. Therefore, it is possible to avoid the situation where, even though a detection result indicating that there is no gas concentration abnormality is output from the detection unit 68, actually, a gas concentration abnormality has occurred. Thus, it is possible to enhance the security.

In the above example, although the present invention has been described mainly in connection with the case where four casings 18 are provided in one package 12, it should be noted that the present invention is applicable to a case where one casing 18 is provided in one package 12, a case where two casings 18 are provided in one package 12, and a case where three casings 18 are provided in one package 12 as well, and it is a matter of course that the present invention is applicable to cases where five or more casings 18 are provided in one package 12. Further, although the present invention has been described in connection with the case where five modules 22 are stacked together to form one module string 24, it should be noted that the present invention is applicable to a case where two or more modules 22 are stacked together to form one module string 24, and a case where six or more modules 22 are stacked together to form one module string 24.

It is a matter of course that the secondary battery abnormality notification system according to the present invention is not limited to the embodiment described above, and various structures can be adopted without deviating from the scope of the present invention.

What is claimed is:

1. A secondary battery abnormality notification system comprising:
    a module string formed by stacking two or more modules in a vertical direction, the modules each being formed by containing a large number of secondary battery cells;
    a conduit pipe extending from an upper position of the module string to a detection unit provided at a lower position of the module string;
    the detection unit configured to draw in a measurement target gas from the conduit pipe to detect concentration of active material contained in the measurement target gas; and
    a notification section configured to detect occurrence of an abnormality at least based on an output of the detection unit and notify that the abnormality has occurred.

2. The secondary battery abnormality notification system according to claim 1, wherein the module string is placed in a box shaped casing;
    the casing includes an air intake opening formed in a front surface of the casing and an air exhaust opening formed at an upper position of the casing; and
    the conduit pipe extends from the air exhaust opening to a lower position of the casing.

3. The secondary battery abnormality notification system according to claim 1, wherein the detection unit comprises:
    a chamber room;
    a pump configured to draw a gas from the conduit pipe into the chamber room and discharge the gas;

a gas sensor configured to detect concentration of active material contained in the measurement target gas in the chamber room; and a first comparator configured to compare concentration detected by the gas sensor with a predetermined upper limit concentration value, wherein a comparison result obtained in the first comparator is outputted to the notification section.

4. The secondary battery abnormality notification system according to claim 3, wherein the secondary battery abnormality notification system is wired using a detection power source and a first detection circuit line;

the detection unit has a first contact point configured to selectively open or short-circuit a connector portion with the first detection circuit line in accordance with an output of the first comparator; and the notification section notifies that an abnormality of gas concentration has occurred, based on a voltage change of the first detection circuit line depending on whether the connector portion of the detection unit is opened or short-circuited.

5. The secondary battery abnormality notification system according to claim 4, comprising a first terminal resistor connected in parallel to a terminal end of the first detection circuit line, wherein the notification section notifies that line disconnection of the first detection circuit line has occurred, based on a voltage change resulting from line disconnection of the first detection circuit line.

6. The secondary battery abnormality notification system according to claim 4, further comprising a second detection circuit line connected to the detection unit, wherein the detection unit further comprises a second comparator configured to compare an output of the gas sensor with a predetermined lower limit output value, and a second contact point configured to selectively open or short-circuit a connector portion with the second detection circuit line in accordance with a comparison result of the second comparator; and the notification section notifies that a sensor abnormality has occurred, based on a voltage change of the second detection circuit line depending on whether the connector portion of the detection unit is opened or short-circuited.

7. The secondary battery abnormality notification system according to claim 6, further comprising a second terminal resistor connected in parallel to a terminal end of the second detection circuit line, wherein the notification section notifies that line disconnection of the second detection circuit line has occurred, based on a voltage change resulting from line disconnection of the second detection circuit line.

8. The secondary battery abnormality notification system according to claim 4, further comprising a second detection circuit line connected to the detection unit, wherein the detection unit further comprises a third comparator configured to compare an exhaust air flow rate of the pump with a predetermined lower limit flow rate value, and a second contact point configured to selectively open or short-circuit a connector portion with the second detection circuit line in accordance with a comparison result of the third comparator; and the notification section notifies that a pump abnormality has occurred, based on a voltage change of the second detection circuit line depending on whether the connector portion of the detection unit is opened or short-circuited.

9. The secondary battery abnormality notification system according to claim 8, further comprising a second terminal resistor connected in parallel to a terminal end of the second detection circuit line, wherein the notification section notifies that line disconnection of the second detection circuit line has occurred, based on a voltage change resulting from line disconnection of the second detection circuit line.

10. The secondary battery abnormality notification system according to claim 4, further comprising a second detection circuit line connected to the detection unit, wherein the detection unit further comprises a second comparator configured to compare an output of the gas sensor with a predetermined lower limit output value, a third comparator configured to compare an exhaust air flow rate of the pump with a predetermined lower limit flow rate value, and a second contact point configured to selectively open or short-circuit a connector portion with the second detection circuit line in accordance with comparison results of the second comparator and the third comparator; and the notification section notifies that an abnormality has occurred, based on a voltage change of the second detection circuit line depending on whether the connector portion of the detection unit is opened or short-circuited.

11. The secondary battery abnormality notification system according to claim 10, further comprising a second terminal resistor connected in parallel to a terminal end of the second detection circuit line, wherein the notification section notifies that line disconnection of the second detection circuit line has occurred, based on a voltage change resulting from line disconnection of the second detection circuit line.

12. The secondary battery abnormality notification system according to claim 1, further comprising a battery control device configured to control operation of the secondary battery cells, wherein the notification section outputs an operation stop signal to the battery control device at time of notifying that the abnormality has occurred; and the battery control device stops operation of the secondary battery cells based on an input of the operation stop signal from the notification section.

\* \* \* \* \*